United States Patent
Palaniappan et al.

(10) Patent No.: US 11,718,415 B2
(45) Date of Patent: Aug. 8, 2023

(54) ENERGY AUTONOMOUS AIRCRAFT EVACUATION SLIDE SYSTEMS AND METHODS

(71) Applicant: Goodrich Corporation, Charlotte, NC (US)

(72) Inventors: Elangovan Palaniappan, Bangalore (IN); Petchi Subramanian, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/714,049

(22) Filed: Apr. 5, 2022

(65) Prior Publication Data

US 2022/0388679 A1 Dec. 8, 2022

(30) Foreign Application Priority Data

Jun. 4, 2021 (IN) .............................. 202141024952

(51) Int. Cl.
*B64D 47/02* (2006.01)
*B64D 25/14* (2006.01)
*F21S 9/04* (2006.01)

(52) U.S. Cl.
CPC ............. *B64D 47/02* (2013.01); *B64D 25/14* (2013.01); *B64D 2203/00* (2013.01); *F21S 9/04* (2013.01)

(58) Field of Classification Search
CPC .... B64D 25/14; B64D 47/02; B64D 2203/00; F21S 9/04
See application file for complete search history.

(56) References Cited

U.S. PATENT DOCUMENTS

| | | | |
|---|---|---|---|
| 3,621,383 A * | 11/1971 | Rush ...................... | B64D 25/14 193/25 B |
| 5,936,521 A * | 8/1999 | Blackman ........... | F21V 23/0442 310/311 |
| 6,482,065 B1 * | 11/2002 | Blackman .............. | A63H 27/10 362/96 |
| 9,932,128 B1 * | 4/2018 | Volny ........................ | F21V 7/00 |
| 10,807,736 B2 | 10/2020 | Palaniappan et al. | |

(Continued)

FOREIGN PATENT DOCUMENTS

| | | | |
|---|---|---|---|
| CN | 104949042 A | * | 9/2015 |
| EP | 3031728 | | 6/2016 |
| EP | 3780333 | | 2/2021 |

OTHER PUBLICATIONS

European Patent Office, European Search Report dated Oct. 5, 2022 in Application No. 22176767.6.

*Primary Examiner* — Alexander K Garlen
(74) *Attorney, Agent, or Firm* — Snell & Wilmer L.L.P.

(57) ABSTRACT

A self-powered, wireless lighting system for an aircraft evacuation system. The lighting system includes a piezoelectric sensor configured to generate electrical energy under an aircraft evacuation event when the aircraft evacuation system is deployed, and a first light source disposed on the aircraft evacuation system, the first light source configured to provide illumination to the aircraft evacuation system. The piezoelectric sensor is operably connected to the first light source and configured to supply electrical energy to the light source based on vibrations in the evacuation system during deployment of the evacuation system and during use of the evacuation system as passengers evacuate the aircraft.

10 Claims, 4 Drawing Sheets

(56) References Cited

U.S. PATENT DOCUMENTS

| | | | |
|---|---|---|---|
| 10,919,643 B1* | 2/2021 | Palaniappan | B64D 47/02 |
| 2004/0104307 A1* | 6/2004 | Stokes | B64D 25/14 |
| | | | 193/25 B |
| 2007/0278902 A1* | 12/2007 | Rastegar | H02K 7/1876 |
| | | | 310/339 |
| 2011/0235328 A1* | 9/2011 | Xu | H10N 10/00 |
| | | | 362/249.02 |
| 2013/0188341 A1* | 7/2013 | Tseng | A43B 3/36 |
| | | | 362/183 |
| 2014/0145610 A1* | 5/2014 | Rode | H10N 30/40 |
| | | | 315/70 |
| 2015/0061375 A1* | 3/2015 | von Heimendahl | B60L 53/00 |
| | | | 307/9.1 |
| 2017/0050736 A1* | 2/2017 | Hartman | B64D 47/02 |
| 2017/0132901 A1* | 5/2017 | Ihn | G01M 5/0083 |
| 2017/0208890 A1 | 7/2017 | Torvinen et al. | |
| 2018/0295786 A1* | 10/2018 | Gutierrez-Wing | A01G 9/249 |
| 2019/0150248 A1* | 5/2019 | Leegate | B64D 47/02 |
| | | | 307/9.1 |
| 2020/0262580 A1* | 8/2020 | Palaniappan | B64D 25/14 |

* cited by examiner

ENERGY AUTONOMOUS AIRCRAFT EVACUATION SLIDE SYSTEMS AND METHODS

CROSS-REFERENCE TO RELATED APPLICATIONS

This application claims priority to, and the benefit of, India Provisional Patent Application No. 202141024952, filed Jun. 4, 2021 and titled "ENERGY AUTONOMOUS AIRCRAFT EVACUATION SLIDE SYSTEMS AND METHODS," which is incorporated by reference herein in its entirety for all purposes FIELD The present disclosure is directed to aircraft evacuation systems and, more particularly, to lighting systems for aircraft evacuation slides.

BACKGROUND

The requirement for reliably evacuating airline passengers in the event of an emergency is well known. A conventional method of quickly evacuating a large number of passengers from an aircraft is to provide multiple emergency exits, each of which is equipped with an inflatable emergency evacuation slide. Since not all emergencies occur during daylight or in well-lit areas, emergency evacuation slides are often equipped with lighting systems to illuminate at least a portion of the evacuation slide when it is deployed.

An evacuation slide is typically required on all commercial (passenger carrying) aircraft where the door sill height is such that, in the event of an evacuation, passengers would be unable to step down from the door uninjured (Federal Aviation Administration requires slides on all aircraft doors where the floor is 6 feet (1.8 m) or more above the ground). Per Federal Regulations, emergency slide lights must provide illumination of not less than 0.03 foot-candle (measured normal to the direction of incident light) at the ground and of the erected assist means where an evacuee would normally make first contact with the airplane in each of the attitudes corresponding to the collapse of one or more legs of the landing gear. The energy supply to each emergency lighting unit typically must provide the required level of illumination for at least 10 minutes at the critical ambient conditions after emergency landing.

Emergency lighting systems for escape slides for vehicles, primarily aircraft, typically include lighting harnesses with a plurality of electric lighting units, a battery pack, and switch mechanism automatically operated to energize lights upon deployment of the slide. The lighting harnesses may be prefabricated in one standard size adaptable for application to slides of widely varying sizes and configurations. The emergency slide is normally carried in the aircraft in a tightly folded condition with lighting units inaccessible SUMMARY Described herein is a lighting system for use with an evacuation slide of an aircraft. The lighting system comprises a case, a printed circuit board disposed in the case, a piezoelectric sensor coupled to the case, the piezoelectric sensor comprising a fixed portion and a movable portion, and a light source in electronic communication with the piezoelectric sensor. The piezoelectric sensor and the light source are disposed on opposite sides of the printed circuit board.

In various embodiments, the piezoelectric sensor comprises a diaphragm.

In various embodiments, the fixed portion comprises a metal plate.

In various embodiments, the movable portion comprises a piezoelectric ceramic disk.

In various embodiments, the piezoelectric sensor is configured to generate electrical energy for the light source in response to the movable portion moving with respect to the fixed portion.

In various embodiments, the light source is disposed in the case.

In various embodiments, the lighting system further comprises a first capacitor configured to store electrical energy generated by the piezoelectric sensor, and a resistor configured to limit a flow of electrical current between the piezoelectric sensor and the light source.

In various embodiments, the lighting system further comprises a second capacitor configured to store electrical energy generated by the piezoelectric sensor, and a diode disposed between the first capacitor and the second capacitor.

In various embodiments, the light source comprises a light emitting diode.

In various embodiments, the case comprises a transparent material.

Described herein is an aircraft evacuation system of an aircraft. The aircraft evacuation system comprises an evacuation slide disposed at an opening in the aircraft, the evacuation slide made of flexible gastight material, and is disposable in each of a stowed configuration and deployed configuration. The aircraft evacuation system further comprises a self-powered, wireless lighting system. The lighting system comprises lighting modules disposed on the aircraft evacuation slide and spaced apart from each other, wherein the lighting modules operate independently of each other. Each of lighting modules includes a light source configured to provide illumination to the aircraft evacuation slide, and a piezoelectric sensor operably connected to the light source and configured to generate electrical energy based upon a change in fluid pressure inside the evacuation slide.

In various embodiments, the piezoelectric sensor comprises a diaphragm.

In various embodiments, the fixed portion comprises a metal plate.

In various embodiments, the movable portion comprises a piezoelectric ceramic disk.

In various embodiments, the piezoelectric sensor is configured to generate electrical energy for the light source in response to the movable portion moving with respect to the fixed portion.

In various embodiments, the piezoelectric sensor is configured to generate electrical energy based upon vibrations of the evacuation slide.

In various embodiments, the aircraft evacuation system further comprises a first capacitor configured to store electrical energy generated by the piezoelectric sensor, and a resistor configured to limit a flow of electrical current between the piezoelectric sensor and the light source.

In various embodiments, the aircraft evacuation system further comprises a second capacitor configured to store electrical energy generated by the piezoelectric sensor, and a diode disposed between the first capacitor and the second capacitor.

In various embodiments, the light source comprises a light emitting diode.

Described herein is a method of illuminating an aircraft evacuation slide of an aircraft evacuation system for an aircraft. The method comprises disposing lighting modules on the aircraft evacuation slide, wherein the evacuation slide is disposed at an opening in the aircraft, the evacuation slide made of flexible gastight material, and is disposable in each of a stowed configuration and deployed configuration, the lighting modules configured to provide illumination to the aircraft evacuation slide. The lighting modules are spaced apart from each other, wherein the lighting modules operate independently of each other. Each of the lighting modules include a light source configured to provide illumination to the aircraft evacuation slide, and a piezoelectric sensor operably connected to the light source and configured to generate electrical energy based upon a change in fluid pressure inside the evacuation slide.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Emergency lighting systems for escape slides for vehicles, primarily aircraft, typically include lighting harnesses with a plurality of electric lighting units, a battery pack, and switch mechanism automatically operated to energize lights upon deployment of the slide. The lighting harnesses may be prefabricated in one standard size adaptable for application to slides of widely varying sizes and configurations. The emergency slide is normally carried in the aircraft in a tightly folded condition with lighting units inaccessible. Because of such a packing configuration, the wiring installation in the slide encounters numerous fabrication and reliability challenges. In addition, as a result of the compact packaging, damage to wiring and components is possible. Moreover, because of the packing forces and configuration, the wiring harnesses and some components for controlling the lighting under deployment conditions may be damaged. Testing the device to ensure its reliability is difficult with access to the slide and its components being limited. To further exacerbate the concerns, a deployed slide with degraded/inadequate lighting as a result faults, and is unavailable for use during an evacuation. As such, an improved scheme for lighting the evacuation slide is needed.

Figure 1:
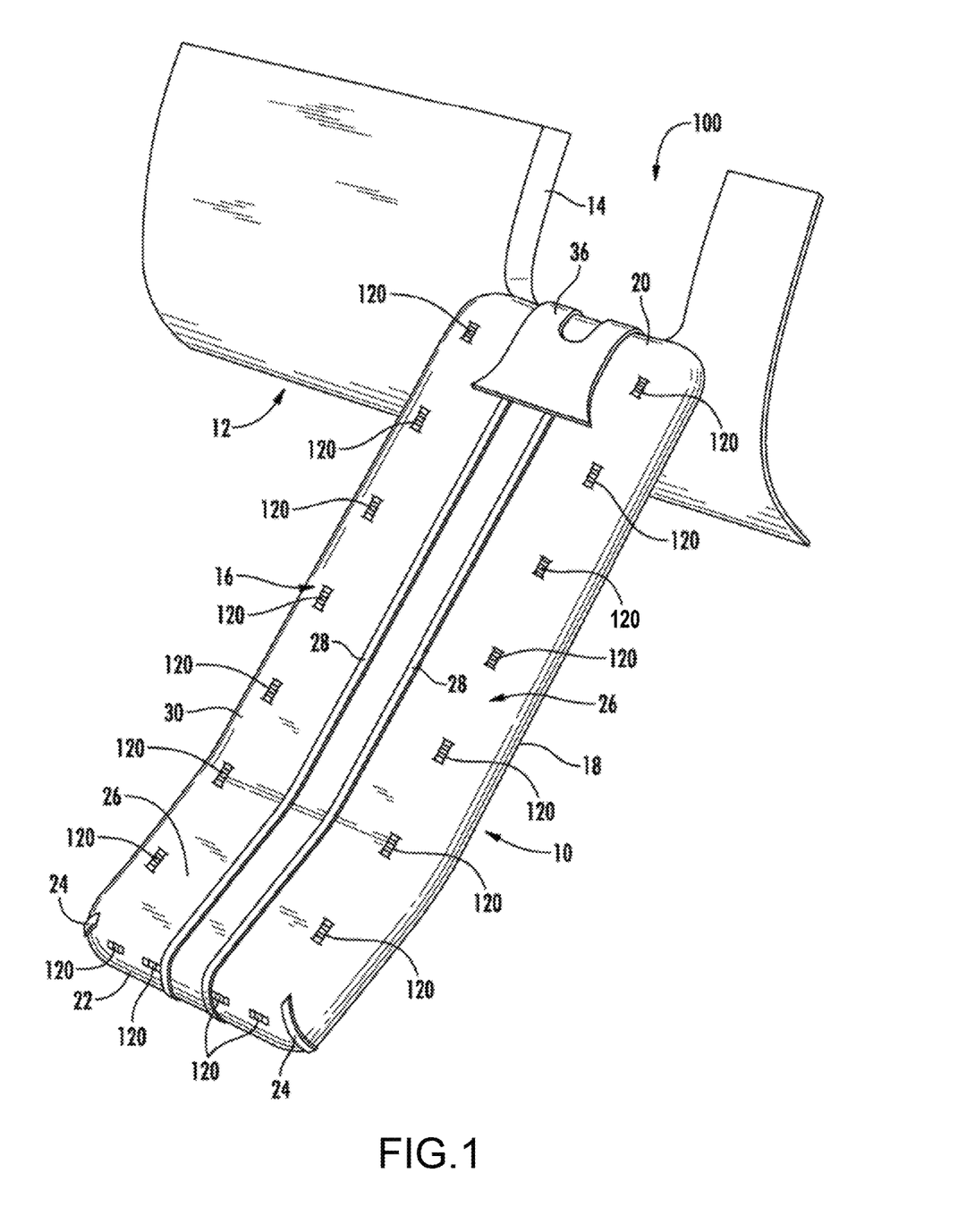
FIG. 1 illustrates an example of an evacuation slide on an aircraft, in accordance with various embodiments.

FIG. 1 depicts an evacuation slide 10 shown in a deployed condition ready for use in which occupants of an aircraft 12 escape through an opening 14. The details of construction of the slide 10 or the manner in which it is secured to the aircraft for emergency use with the opening 14 and the associated door or window (not shown) are conventional and not described further herein. The escape slide 10 as shown in FIG. 1 is illustrated in simplified and diagrammatic fashion and it is intended only to suggest a construction typical of the many types of slides, stairs and the like to which the emergency lighting system of the described embodiments may be secured. Such a typical evacuation slide 10 may be made up of one or more generally tubular inflatable bolsters of gastight material, such as rubber or plastic coated fabric, mitered together at the corners to form a generally rectangular structure when inflated. Longitudinal bolsters 16 and 18 are mitered to transverse bolsters 20 and 22 at corners indicated generally at 24. The upper surface 30 of the slide 10 comprises a sheet of fabric 26 which is firmly secured to the four bolsters 16, 18, 20, 22. The fabric 26 thus serves as the surface upon which persons slide when evacuating an aircraft 12. Usually the surface fabric 26 is provided with grounding strips 28 of electrically conductive material on or integral with the fabric 26, which extend around the lower ends of the slide 10 so as to come into contact with the ground upon deployment of the slide 10. A scuff strip may also rests upon the ground to protect the deployed slide 10 from damage. Static electrical charges built up on the body of the slide 10 or the bodies of the users of the slide 10 will be discharged to the ground through the grounding strips 28, reducing the discomfort of electrical shock and also reducing the risk of ignition of any ambient flammable liquids or gases.

The lower surfaces of the longitudinal bolsters 16, 18 also may be cross-connected by web straps (not shown) spaced along the length of the slide 10 to further stabilize slide 10 when in the deployed condition. An apron 36 may be employed and is made of flexible material and frequently serves the dual purpose of attachment to the aircraft 12 and of providing a surface which gives a reassuring continuity to the surface of the slide 10 and the interior of the aircraft 12. It will be understood that the length and width of the slides 10 will vary greatly depending upon the aircraft 12 for which they are designed and also depending upon the particular exit with which they are to cooperate. In a general sense, for use with commercial aircraft in use, the slides 10 may vary in length from a minimum of about 140" to a maximum of about 270". Obviously, as larger aircraft or aircraft of different configurations are brought into use the range of lengths of the slides 10 may be extended at both ends.

Slides 10 of the types here involved are normally carried in the aircraft or other vehicle in deflated, stowed condition adjacent the door or other opening with which they are intended for use in an emergency. A typical configuration of a stowed slide 10 requires the evacuation of enclosed air and it is folded up by trained personnel in a specific manner, an operation which, as noted above, takes a large number of man-hours to complete. The stowed slide 10 is held in a folded condition by various types of breakaway fastening devices including, in some cases a plurality of separable fasteners. A lanyard (not shown) is usually provided for initiation of inflation and deployment of the slide 10 when desired. Generally, a cylinder of highly compressed gas (not shown) is enveloped in the upper portions of the folds of the packed slide 10. The assembly may also include a pressure gauge in visible position for routine checking by inspectors. The assembly is connected by a flexible tube to the interior of the slide 10, an aspirator is associated with a gas supply tube as to admit air by injection when the highly compressed gas from cylinder enters and expands into the slide 10. In a typical installation the cylinder may contain nitrogen under a pressure of about 3,000 psi. An aspirator system may be employed to facilitate the fully inflating the deployed slide 10 such that air and nitrogen fill the inflatable bolsters 16, 18, 20, 24 and the like. Suitable relief valves are usually provided, not shown herein, to protect the structure from over inflation. During inflation the various breakaway devices mentioned above will release in proper sequence to ensure inflation of all internal regions of the slide 10 and thus the assumption of proper deployed shape as shown in FIG. 1.

Figure 2:
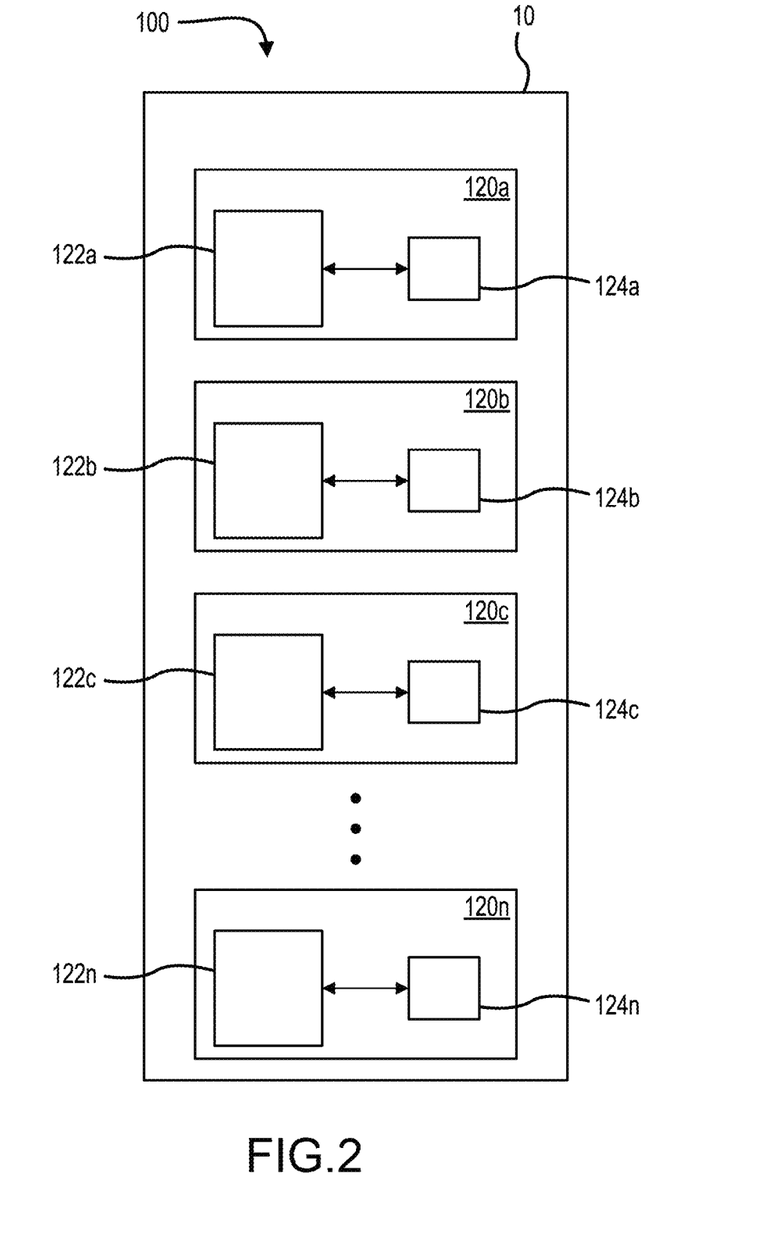
FIG. 2 illustrates a block diagram of a light system, in accordance with various embodiments.

Turning now to FIG. 2 as well, slide 10 also includes a self-powered wireless lighting system shown generally as 100. Lighting system 100 includes a plurality of lighting units or modules shown generally as 120 and more specifically as 120a, 120b, 120c, . . . 120n disposed on the slide 10 and distributed as needed along its length and width to provide sufficient lighting in accordance with requirements and regulations on the slide 10. In various embodiments, each of the lighting modules 120 is a standalone unit activated by vibrations and/or varying pressure forces within the slide 10 during inflation and use of the slide 10. For example, when an evacuation situation arises and the door is opened, the activation lanyard (described herein) pulls a trigger and opens the gas cylinder to activate and deploy the slide 10. In addition, pressure within slide 10 varies under the weight of the passengers as they evacuate from the airplane via slide 10. Due to this process, an energy harvesting portion of the lighting module 120 will experience vibrations and due to these vibrations, electrical energy will be continuously generated during an emergency evacuation of the aircraft.

Each lighting unit 120 may include a piezoelectric sensor referred to generally as 122 and more specifically as 122a, 122b, 122c, . . . 122n operably coupled to a light source referred to generally as 124 and more specifically as 124a, 124b, 124c, . . . 124n. Sensor 122 is configured to generate electrical energy to power light source 124. In this regard, each sensor 122 is in electronic communication with a light source 124. In this regard, light source 124 is configured to receive electric power (e.g., electrical current and voltage) from sensor 122. More particularly, and with reference to FIG. 3, sensor 122 may comprises a non-movable part 132 (also referred to herein as a fixed portion) and a movable part 134 (also referred to herein as a movable portion) operatively coupled with the non-movable part 132. Sensor 122 may be configured to generate electrical energy in response to movable part 134 moving with respect to non-movable part 132. In various embodiments, movable part 134 moves with respect to non-movable part 132 based on changes in fluid pressure inside slide 10 and general vibrations of slide 10 under deployment and use. For example, sensor 122 will undergo multiple vibrations during the rapid release of gas into slide 10 as well as during use as passengers evacuate the aircraft with slide 10.

Figure 3:
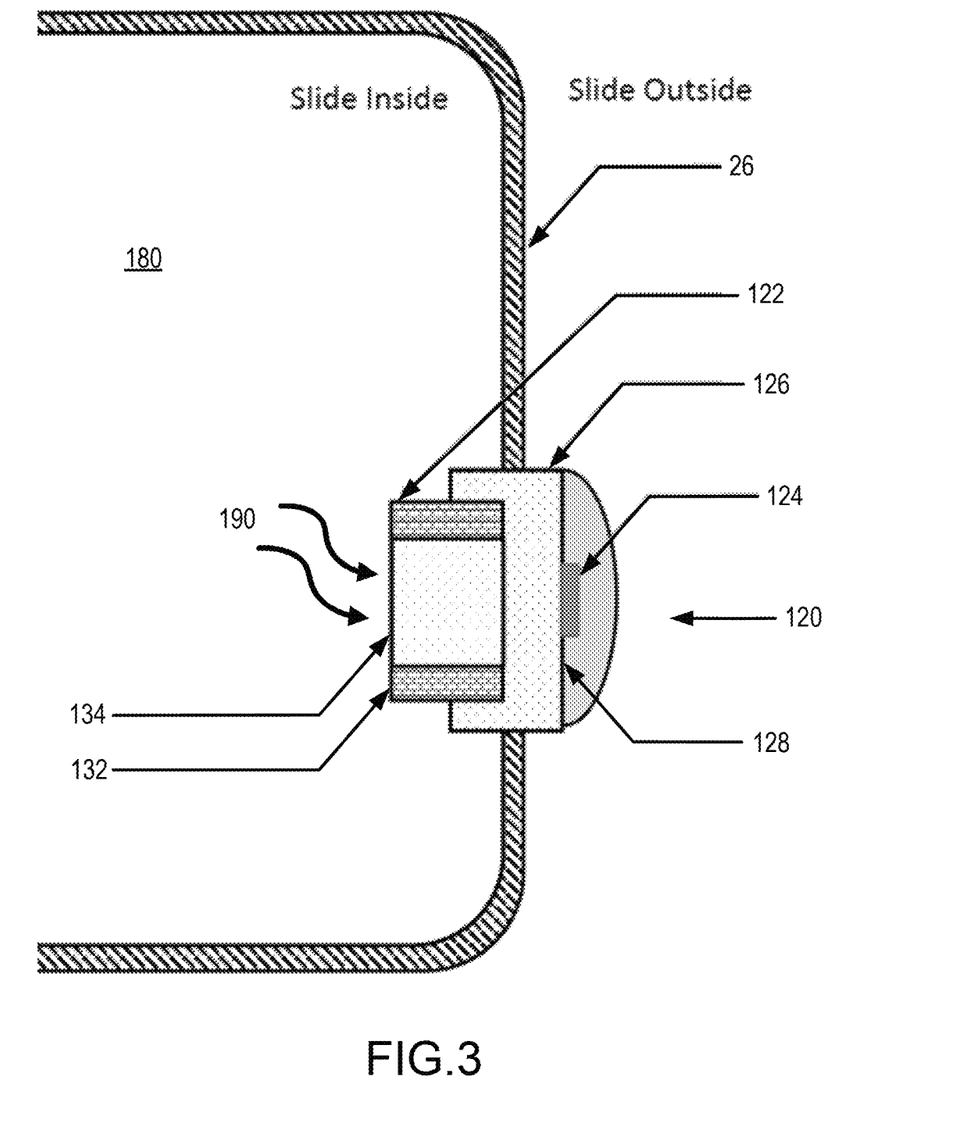
FIG. 3 illustrates a section view of a light system installed on the evacuation slide of FIG. 1, in accordance with various embodiments.
Figure 4:
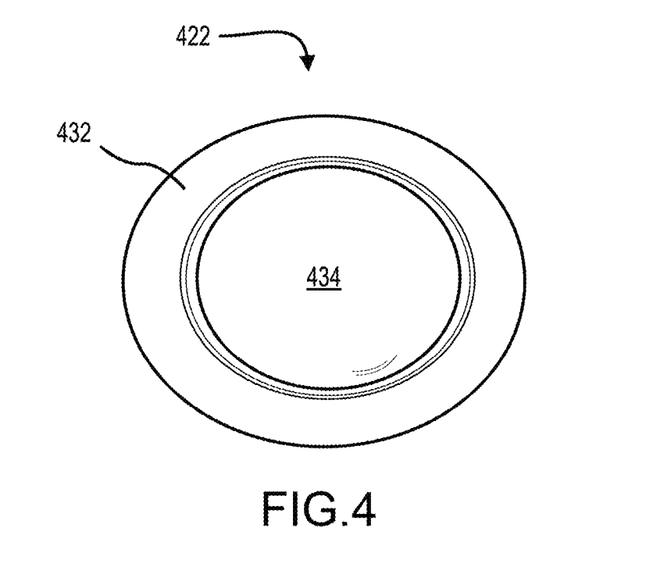
FIG. 4 illustrates a piezoelectric diaphragm, in accordance with various embodiments.

In various embodiments, and with momentary combined reference to FIG. 3 and FIG. 4, sensor 122 comprises a piezoelectric diaphragm 422 configuration, wherein movable part 134 comprises a piezoelectric ceramic disk 434 and the non-movable part 132 comprises a metal plate 432 (e.g., made of brass or nickel-alloy) adhered to the movable part 134. In this manner, sensor 122 may be configured for vibration energy harvesting.

In various embodiments, the light source 124, or more specifically 124a, 124b, 124c . . . 124n, is an energy efficient LED or LED array configuration or other energy efficient light source with sufficient illumination capability that when arranged on the slide 10 satisfy the illumination regulations for the application. In various embodiments, the light source is any illumination source more efficient than incandescent bulbs. In various embodiments, the sensor 122 and light source 124 are preferably integrated into a single modular package for ease of installation in the slide 10.

With particular focus on FIG. 3, each lighting module 120 may further comprise a case 126. Case 126 may be coupled to fabric 26 such that part of the case 126 is exposed to the inner chamber 180 of slide 10 and part of the case 126 is exposed to the exterior of slide 10. Light source 124 may be housed within case 126. At least a portion of case 126 may be made of a transparent material to allow light to be transmitted from light source 124 to provide illumination to slide 10. Each lighting module 120 may further comprise a printed circuit board 128. Printed circuit board 128 may be coupled to case 126. Sensor 122 may be coupled to printed circuit board 128. Light source 124 may be coupled to printed circuit board 128. Light source 124 and sensor 122 may be on opposite sides of printed circuit board 128. In this manner, light source 124 may face outward from fabric 26 and sensor 122 may face inward (i.e., towards inner chamber 180) from fabric 26. In this manner, sensor 122 may be in fluid communication with inner chamber 180. Furthermore, in this manner, light source 124 may be configured to provide illumination to slide 10.

Fluid pressure illustrated generally by arrows 190 may act on sensor 122. In this manner, as the pressure inside chamber 180 varies, vibrational movement may be imparted onto sensor 122, causing movable part 134 to move with respect to non-movable part 132 to generate electrical energy for powering light source 124. Fluid pressure 190 may impart a force to act on sensor 122 due to gas release into chamber 180 and/or passengers using (e.g., sliding down) the slide.

Figure 5:
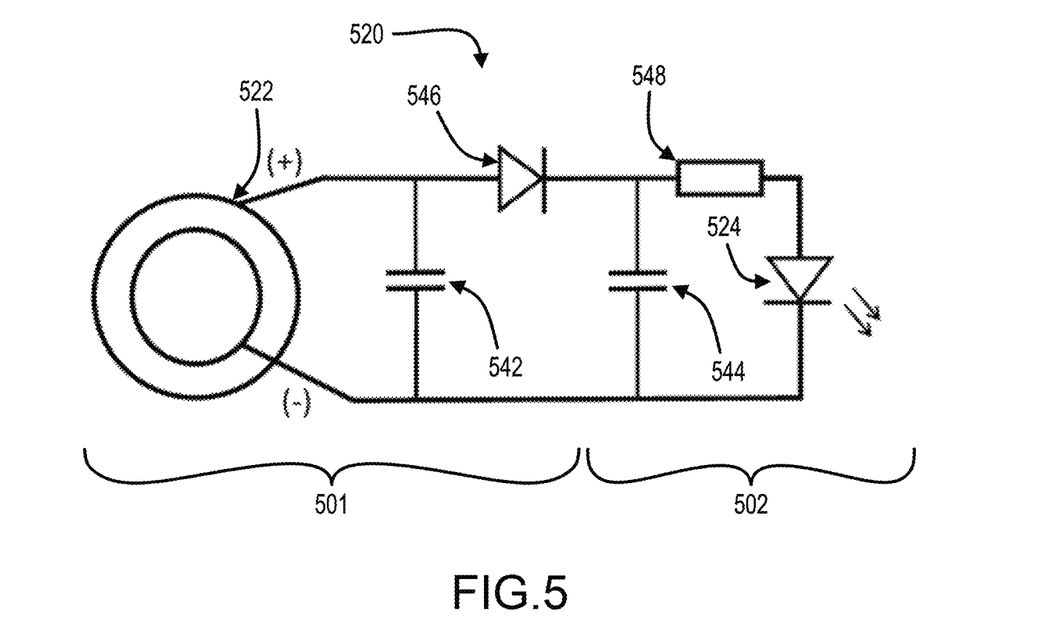
FIG. 5 illustrates a circuit diagram of a lighting module, in accordance with various embodiments.

With reference to FIG. 5, a block diagram of lighting module 520 is illustrated, in accordance with various embodiments. In various embodiments, lighting module 120 (see FIG. 1 through FIG. 3) may be similar to lighting module 520. Lighting module 520 may comprise an energy harvesting portion 501 comprising piezoelectric sensor 522 and an energy utilization portion 502 comprising light source 524. In various embodiments, piezoelectric sensor 522 and light source 524 are similar to sensor 122 and light source 124, respectively, of FIG. 1 through FIG. 3. In various embodiments, piezoelectric sensor 522 is similar to sensor 422 of FIG. 4.

Lighting module 520 may further comprise a first capacitor 542. First capacitor 542 may be part of energy harvesting portion 501. First capacitor 542 may be a super capacitor. In use, first capacitor 542 may accumulate the instantaneous energy generation from the piezoelectric sensor 522.

Lighting module 520 may further comprise a second capacitor 544. Second capacitor 544 may be part of energy utilization portion 502. Second capacitor 544 may be a storage capacitor, such as an electrolytic capacitor for example. In use, second capacitor 544 may store the harvested energy and maintain sustained energy flow to the light source 524.

Lighting module 520 may further comprise a diode 546. Diode 546 may be part of energy harvesting portion 501. Diode 546 may be a Schottky diode. Diode 546 may be disposed between first capacitor 542 and second capacitor 544. In use, diode 546 may provide reverse voltage protection.

Lighting module 520 may further comprise a resistor 548. Resistor 548 may be part of energy utilization portion 502. Resistor 548 may be used as a current limit resistor.

In view of the exacting requirements for proper folding and deployment of the slide 10 and in view of the demand for minimum space occupancy when the slide 10 is folded, it will be apparent that an emergency lighting system 100 must be so designed and installed as not to interfere with or further complicate the stowing and deploying operations and it must not significantly increase the size of the folded slide 10.

Maximum benefit from the lighting system incorporating the preferred components described above or components of equivalent or, when developed, of superior quality, and convenient testing provisions herein disclosed will be realized when piezoelectric sensors 122 and light sources 124 having long shelf-life are employed. In various embodiments, piezoelectric sensors 122 and light sources 124 with a multi-year shelf life makes it possible, in the absence of unexpected damage, deterioration or failures of the various components, to leave the slides 10 equipped with such systems in service in packed and tightly folded condition for multi-year periods (typically four years at a time) throughout the service lives of the slides 10. Since it is customary in many instances at the present time to test all slides by deployment and repacking at selected intervals, the installation of the lighting system 100 of the described embodiments will not make deployment and repacking necessary at intervals more frequent that those already established and may in fact reduce the inspection intervals.

The shape and location of the piezoelectric sensor(s) 122 and the electrical and mechanical relationship thereof with light source(s) 124 as well as the specific design thereof may be varied to meet specific desires or requirements as needed. For example, when the folding pattern for a particular evacuation slide 10 design makes it preferable to configure or locate one or more lighting module(s) of suitable shape and configuration other than that employed for others in the lighting system 100. It should also be appreciated that in some embodiments some lighting modules 120 may include a single piezoelectric sensor 122 per light source 124, while others may employ more or less than one piezoelectric sensor 122 per light source 124. Moreover, in some instances a single piezoelectric sensor 122 may be employed to control and power more than one lighting module 120, wherein wires may be coupled between adjacent lighting modules. Though such a configuration may limit flexibility and reliability of fully standalone modules, there may be instances where it may be advantageous based on cost, configuration and the like.

Advantageously the described embodiments facilitate the fabrication of an evacuation slide 10 with improved reliability by eliminating many or all of the wires of conventional configurations. This avoids the risk of damage to the wiring typically resultant from the folding and packing of the slide 10. Another feature of the described embodiments is that by making each of the lighting modules 120 independent, and having their own energy generating device, the constant current module and wiring of existing designs is eliminated. Advantageously this approach provides for a significant reliability improvement by eliminating a potential single point failure component in legacy systems.

Another advantage of the described embodiments is that a wireless, standalone configuration eliminates the bonding or taping of the wires to the slide of existing designs. Furthermore, the described embodiments maintain each of the lighting modules 120 independent of the others and, as a result, failure in one device does not impact another lighting module, whereas with conventional designs a wire cut would result in the loss of operation of all lights connected in the circuit supplied by the cut wire. Another advantage of the described embodiments is that the standalone, independent nature of the lighting modules provides for a significant reliability improvement by eliminating cross talk failure in legacy systems that use wired or wireless signals for activating and/or powering the light sources.

Yet another improved technical feature of the described embodiments is that the self-powered wireless lighting system 100 with independent lighting modules means that select lighting modules may be configured to operate differently than other modules if desired. For example dimming, brightness, flashing, strobing, coordinated flashing, even color, and the like. As a result of the independent nature of the standalone lighting modules 120 of the described embodiments, reliability and flexibility of the overall lighting system 100 for the slide 10 is improved. Furthermore, depending on the lighting module 120 and the light source 124 other alternatives are possible.

For example, in an embodiment the light source 124 may configured as multi-color LEDs (Red, Green, Blue) (RGB LEDs). By using such a configuration, different light sources 124 in various lighting modules 120 along the length of the slide 10 can be configured to glow in different colors. For example: in one embodiment, from the top of the slide as attached to the aircraft 12, a first number of light sources 124 e.g., (LEDs) may be configured to glow in a first color, e.g., Green; then further on the slide 10, a second number of light sources 124, e.g., LEDs may be configured to glow in a second color, e.g., blue; and finally, perhaps at the base of the slide 10, some other light sources 124 may be configured to glow in a third color, e.g., red.

Currently only white color light sources are used in aircraft slides. One advantage of the described embodiments is that the lighting modules 120 can be configured in a variety of configurations such as alternating a number of light sources 124 e.g., LEDs, such as 1st, 3rd, 5th . . . ) first 5 minutes and then even numbered light sources 124 (such as 2nd, 4th, 6th . . . ) will glow later. Furthermore the light sources could be flashing along the length of the slide indicating and illustrating the trajectory path on the slide all while conserving energy to minimize the required size of the sensor 122.

The term "about" is intended to include the degree of error associated with measurement of the particular quantity based upon the equipment available at the time of filing the application.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft evacuation system of an aircraft comprising:
an evacuation slide disposed at an opening in the aircraft, the evacuation slide made of flexible gastight material, and is disposable in each of a stowed configuration and deployed configuration;
a self-powered, wireless lighting system that comprises:
lighting modules disposed on the aircraft evacuation slide and spaced apart from each other, wherein the lighting modules operate independently of each other, each of lighting modules including:
a light source configured to provide illumination to the aircraft evacuation slide; and
a piezoelectric sensor operably connected to the light source and configured to generate electrical energy based upon a change in fluid pressure inside the evacuation slide.

2. The aircraft evacuation system of claim 1, wherein the piezoelectric sensor comprises a diaphragm.

3. The aircraft evacuation system of claim 2, wherein the piezoelectric sensor comprises a fixed portion comprising a metal plate.

4. The aircraft evacuation system of claim 3, wherein the piezoelectric sensor comprises a moveably portion comprising a piezoelectric ceramic disk.

5. The aircraft evacuation system of claim 4, wherein the piezoelectric sensor is configured to generate the electrical energy for the light source in response to the movable portion moving with respect to the fixed portion.

6. The aircraft evacuation system of claim 5, wherein the piezoelectric sensor is configured to generate the electrical energy based upon vibrations of the evacuation slide.

7. The aircraft evacuation system of claim 1, further comprising:
a first capacitor configured to store the electrical energy generated by the piezoelectric sensor; and
a resistor configured to limit a flow of electrical current between the piezoelectric sensor and the light source.

8. The aircraft evacuation system of claim 7, further comprising:
a second capacitor configured to store the electrical energy generated by the piezoelectric sensor; and
a diode disposed between the first capacitor and the second capacitor.

9. The aircraft evacuation system of claim 1, wherein the light source comprises a light emitting diode.

10. A method of illuminating an aircraft evacuation slide of an aircraft evacuation system for an aircraft, the method comprising:
disposing lighting modules on the aircraft evacuation slide, wherein the evacuation slide is disposed at an opening in the aircraft, the evacuation slide made of flexible gastight material, and is disposable in each of a stowed configuration and deployed configuration, the lighting modules configured to provide illumination to the aircraft evacuation slide, wherein: the lighting modules are spaced apart from each other, wherein the lighting modules operate independently of each other, each of lighting modules including:
a light source configured to provide illumination to the aircraft evacuation slide; and
a piezoelectric sensor operably connected to the light source and configured to generate electrical energy based upon a change in fluid pressure inside the evacuation slide.

\* \* \* \* \*